(No Model.)
L. D. BUSBEE & C. M. ROSSER.
DEVICE FOR THE DISPOSAL OF NIGHT SOIL, &c.
No. 513,877. Patented Jan. 30, 1894.
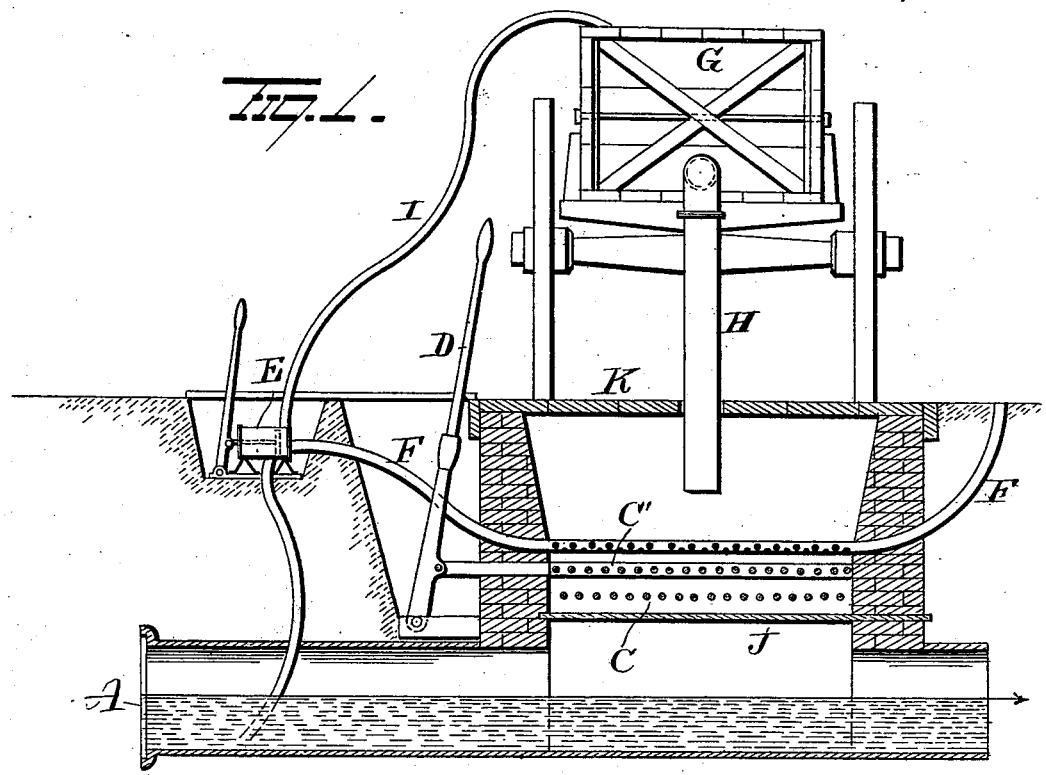
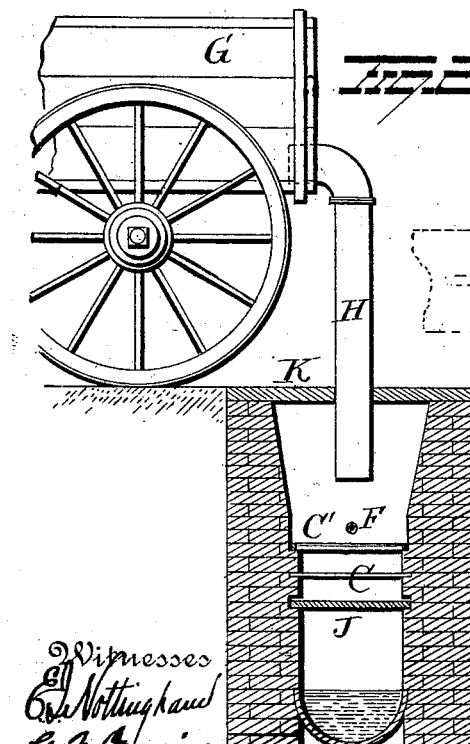
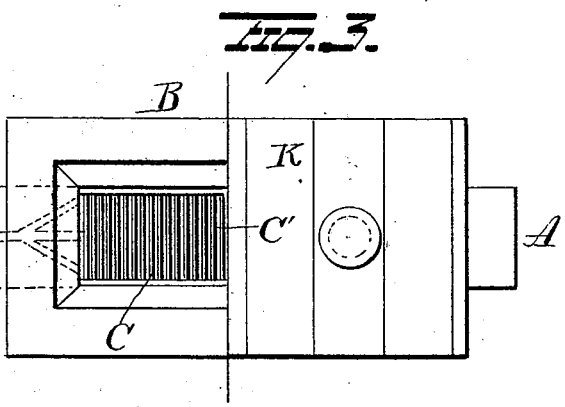
Witnesses
Inventors
L. D. Busbee
C. M. Rosser
By H. A. Seymour
Attorney

UNITED STATES PATENT OFFICE.

LORANZO D. BUSBEE AND CHARLES M. ROSSER, OF DALLAS, TEXAS.

DEVICE FOR THE DISPOSAL OF NIGHT-SOIL, &c.

SPECIFICATION forming part of Letters Patent No. 513,877, dated January 30, 1894.

Application filed March 15, 1893. Serial No. 466,093. (No model.)

*To all whom it may concern:*

Be it known that we, LORANZO D. BUSBEE and CHARLES M. ROSSER, both citizens of the United States, residing in the city of Dallas, in the county of Dallas and State of Texas, have jointly invented a new and useful Device for the Disposal by Water of All Night-Soil and the Destruction of Disease-Producing Germs, where desired, of which the following is a specification.

Our invention relates to the disposal of night-soil by water and the destruction of disease producing germs in the same in centers of population which are situated near running streams or large bodies of water. We attain this end by means of the sanitary sewage destroyer, illustrated in the accompanying drawings, in which—

Figure 1 is a longitudinal section of the entire sewage destroying machine; Fig. 2 a transverse section, and Fig. 3 a ground plan of the same.

Similar letters refer to similar parts in the different views.

A represents the outlet sewer in places provided with sewer systems. In places not so provided it represents a pipe laid from the machine to the stream or body of water that may be used to receive the sewage after it is destroyed.

B represents a rectangular basin.

C represents grates rigidly fastened into said basin.

C' represents grates set in a frame which is movable laterally by means of lever D, as shown.

E represents a hand pump (other power to be used when desired) taking water from the sewer. In the absence of a sewer water may be taken from a well, or when water-mains are near water may be taken from them, thus dispensing with the use of the pump.

F represents a pipe leading from pump or water-main to basin. This pipe is perforated in that part which runs through the basin so as to distribute the water or stream that is introduced into the basin through it.

G is a tank containing night-soil or other sewage.

H is a large hose leading from the tank to the basin; I a hose leading from the pump or water-main to tank, G.

J is a horizontal slide gate that can be drawn entirely out.

K is a gate that closes tight over the basin.

The mode of operation of this machine is as follows:—The contents of tank G are discharged through hose H into basin, B; said contents being diluted when necessary by water from hose I; at the same time the movable grates C' are worked by lever D, and water enters basin B through base pipe F leading from pump. By this means all solids are broken up and dissolved, and the materials discharged from the basin by opening the slide gate J are in about the same condition as sewage which has flowed through a long system of pipes.

Whenever the prevention of pollution of streams or bodies of water comes into consideration, or it is desired to destroy disease producing germs the gates J and K are put in place, and as the contents of tank G are discharged into basin B the liquid shall be met by jets of steam introduced through pipes, and whenever a sufficient amount of steam has been introduced into the basin to bring the mixture to 212° Fahrenheit, at which it shall remain for ten minutes, or a greater degree of heat for a shorter period of time, it shall be discharged into the sewer by opening gate J.

Having thus described our invention, what we claim as new, and desire to secure by Letters Patent, is—

1. In apparatus for the disintegration and purification of night-soil or other refuse, the combination with a basin adapted for the reception of said night-soil or refuse, of a stationary and a shaking grate in said basin, substantially as set forth.

2. In apparatus for the disintegration and purification of night soil or other refuse, the combination with a basin adapted for the reception of said night soil or refuse, of a grate in said basin, a perforated pipe in the basin, means for running fluid through said pipe and a gate at the bottom of said basin, substantially as set forth.

3. In apparatus for the disintegration and purification of night soil, the combination with a basin, and a water channel into which the basin discharges, of grate in the basin, and water discharge pipe located above the grate, substantially as set forth.

4. In apparatus for disintegration and purification of night soil, the combination with water pipe or channel, and a basin discharging in the latter, of a stationary and movable grate in the basin, and water discharge pipe located above the grates, substantially as set forth.

5. In apparatus for disintegration and purification of night soil, the combination with a water pipe or channel and a basin discharging into the channel, of a removable bottom in the basin a fixed and movable grate, and a water discharge pipe located above the grates, substantially as set forth.

6. In apparatus for the disintegration and purification of night soil or other refuse, the combination with a basin adapted for the reception of said night soil or refuse, of a pipe located under the same and adapted to receive material from the basin, grate located in said basin and means for spraying fluid in said basin over the grate, substantially as set forth.

7. In apparatus for the disintegration and purification of night soil or other refuse, the combination with a basin adapted for the reception of said night soil or refuse, a body of water under said basin, and a pump, of a pipe extending from said body of water to the pump, and a pipe extending from the pump through the basin, said last-mentioned pipe having a series of perforations where it passes through the basin, substantially as set forth.

LORANZO D. BUSBEE.
C. M. ROSSER.

Witnesses:
KIRK WILLIAMS,
E. E. DICKASON.